United States Patent
Kuehner et al.

(10) Patent No.: US 12,272,160 B2
(45) Date of Patent: Apr. 8, 2025

(54) SYSTEMS AND METHODS FOR ESTIMATING GRIP INTENSITY ON A STEERING WHEEL

(71) Applicant: Woven by Toyota, Inc., Tokyo (JP)

(72) Inventors: Manuel Ludwig Kuehner, Mountain View, CA (US); Hiroshi Yasuda, San Francisco, CA (US)

(73) Assignee: Woven by Toyota, Inc., Tokyo (JP)

( * ) Notice: Subject to any disclaimer, the term of this patent is extended or adjusted under 35 U.S.C. 154(b) by 181 days.

(21) Appl. No.: 18/073,790

(22) Filed: Dec. 2, 2022

(65) Prior Publication Data

US 2024/0185620 A1 Jun. 6, 2024

(51) Int. Cl.
*G06V 20/59* (2022.01)
*B60R 1/29* (2022.01)
(Continued)

(52) U.S. Cl.
CPC .............. *G06V 20/597* (2022.01); *B60R 1/29* (2022.01); *B60W 50/06* (2013.01); *B60W 50/087* (2013.01); *B60W 50/14* (2013.01); *B62D 15/00* (2013.01); *G01L 5/221* (2013.01); *G06T 7/50* (2017.01); *G06V 10/774* (2022.01);
(Continued)

(58) Field of Classification Search
CPC .... G06V 20/597; G06V 10/774; G06V 40/11; G06V 40/15; B60R 1/29; B60W 50/06; B60W 50/087; B60W 50/14; B60W 2420/00; B60W 2420/403; B60W 2422/00; B62D 15/00; B62D 6/007; B62D 15/025; G01L 5/221; G06T 7/50; (Continued)

(56) References Cited

U.S. PATENT DOCUMENTS

| | | | |
|---|---|---|---|
| 5,769,085 | A | 6/1998 | Kawakami et al. |
| 2012/0296528 | A1 | 11/2012 | Wellhoefer et al. |

(Continued)

FOREIGN PATENT DOCUMENTS

| | | |
|---|---|---|
| CN | 101840632 A | 9/2010 |
| CN | 103150560 A | 6/2013 |

(Continued)

*Primary Examiner* — Isaac G Smith
*Assistant Examiner* — Nikki Marie M Molina
(74) *Attorney, Agent, or Firm* — Christopher G. Darrow; Darrow Mustafa PC

(57) ABSTRACT

Systems, methods, and other embodiments described herein relate to implementing and calibrating a learning model for inferring operator intent by estimating grip intensity. In one embodiment, a method includes estimating, using a learning model during a driving scenario, first grip intensity on a steering device for a vehicle according to initial image data depicting a hand of an operator gripping outside the set areas that have pressure sensors. The method also includes calibrating the learning model for the operator and the steering device using grip measurements and additional image data acquired from gripping inside the set areas. The method also includes computing, using the learning model during the driving scenario, second grip intensity outside the set areas on the steering device according to hand images acquired about the operator. The method also includes adapting a vehicle parameter of the vehicle according to the second grip intensity.

20 Claims, 5 Drawing Sheets

(51) Int. Cl.
*B60W 50/06* (2006.01)
*B60W 50/08* (2020.01)
*B60W 50/14* (2020.01)
*B62D 15/00* (2006.01)
*G01L 5/22* (2006.01)
*G06T 7/50* (2017.01)
*G06V 10/774* (2022.01)
*G06V 40/10* (2022.01)

(52) U.S. Cl.
CPC .............. *G06V 40/11* (2022.01); *G06V 40/15* (2022.01); *B60W 2420/00* (2013.01); *B60W 2420/403* (2013.01); *B60W 2422/00* (2013.01); *G06T 2207/10048* (2013.01); *G06T 2207/20081* (2013.01); *G06T 2207/30196* (2013.01); *G06T 2207/30268* (2013.01)

(58) Field of Classification Search
CPC . G06T 2207/10048; G06T 2207/20081; G06T 2207/30196; G06T 2207/30268
See application file for complete search history.

(56) References Cited

U.S. PATENT DOCUMENTS

| | | | |
|---|---|---|---|
| 2017/0014036 A1 | 1/2017 | Kang et al. | |
| 2017/0320517 A1 | 11/2017 | Michelis et al. | |
| 2018/0326992 A1 | 11/2018 | Aoi et al. | |
| 2020/0216079 A1* | 7/2020 | Mahajan | B60W 60/0051 |
| 2020/0285231 A1* | 9/2020 | Herman | A61B 5/1115 |
| 2021/0107527 A1* | 4/2021 | Karve | B60W 40/08 |
| 2022/0161846 A1* | 5/2022 | Ghanbari | B60W 30/12 |
| 2023/0322235 A1* | 10/2023 | Won | B60W 40/09 |
| | | | 701/1 |

FOREIGN PATENT DOCUMENTS

| | | |
|---|---|---|
| CN | 104856707 A | 8/2015 |
| CN | 106157537 A | 11/2016 |
| CN | 208126611 U | 11/2018 |
| CN | 110516658 A | 11/2019 |
| CN | 111055846 A | 4/2020 |
| CN | 112419672 A | 2/2021 |
| CN | 112590800 A | 4/2021 |

\* cited by examiner

SYSTEMS AND METHODS FOR ESTIMATING GRIP INTENSITY ON A STEERING WHEEL

TECHNICAL FIELD

The subject matter described herein relates, in general, to estimating a grip intensity of a vehicle operator, and, more particularly, to implementing a learning model for inferring operator intent by estimating the grip intensity.

BACKGROUND

Vehicles use sensors that generate data for assisting an operator with maneuvering, safety, and so on. For example, a vehicle is equipped with a light detection and ranging (LIDAR) sensor that uses light to scan the surrounding environment, while logic associated with the LIDAR analyzes acquired data to detect a presence of objects and other features of the surrounding environment. In further examples, cameras may be implemented to acquire information about the surrounding environment from which a system derives awareness about aspects of the surrounding environment. The vehicle may also use data from the cameras to monitor the operator for estimating awareness, emotional states, etc. This sensor data can be useful in various circumstances for improving perceptions of the surrounding environment so that systems, such as automated driving systems, can perceive the noted aspects and accurately plan and navigate accordingly.

In various implementations, a vehicle system acquires data from pressure sensors on the steering wheel and seat for estimating operator states. For example, the vehicle system processes pressure data from the steering wheel to detect one or two-handed driving. However, the vehicle system may detect false negatives unless the pressure sensors are installed throughout the steering wheel or use advanced materials. Installing pressure sensors on the steering wheel increases manufacturing costs, complexity, and bulk. Furthermore, certain shapes of steering wheels have limited space to install pressure sensors, thereby reducing the availability of data points for reliable detection.

SUMMARY

In one embodiment, example systems and methods relate to implementing and calibrating a learning model for inferring operator intent by estimating grip intensity. In various implementations, systems that detect grip information on steering devices (e.g., steering wheels) use costly hardware and produce unreliable estimates. For example, a steering wheel having pressure sensors throughout the body raises production costs. Furthermore, systems relying primarily on data from pressure sensors have reduced applications for estimating operator intent during atypical driving scenarios due to limited dimensionality from modeling. Therefore, in one embodiment, a detection system computes grip intensity from an operator holding a steering device (e.g., steering wheel) by using image data of grasps for estimating operator intent (e.g., a steering angle). In particular, the detection system acquires image data of an operator handling the steering device outside set areas having pressure sensors for computing the grip intensity in a learning model trained offline (i.e., a simulated environment) with test images. Furthermore, the detection system calibrates the learning model online (e.g., actual driving) using grip measurements inside the set areas with hand images of gripping that reduce errors from training the learning model. In this way, the detection system estimates grip intensities more accurately outside the set areas by calibrating the learning model for particular operators when the grip measurements are available. Also, the detection system reduces costs through utilizing inexpensive pressure sensors within limited areas of the steering device for the calibration and relying on the hand images for computing the grip intensity after training the learning model.

Moreover, in one embodiment, the detection system trains the learning model offline in a testing environment using test images of operator grasps. The testing environment uses a steering device having pressure sensors with sensitive and dense receptors (e.g., surface capacitors) for accuracy. These pressure sensors may be located throughout the body, including outside the set areas. Here, the detection system correlates test images of grip patterns (e.g., two-handed driving) with measured intensities from the pressure sensors on the steering device. Accordingly, the detection system estimates grip intensities on a steering wheel by training a learning model to use hand images so that sparse pressure data is utilized during implementation.

In one embodiment, a detection system for implementing and calibrating a learning model for inferring operator intent by estimating grip intensity is disclosed. The detection system includes a memory storing instructions that, when executed by a processor, cause the processor to estimate, using a learning model during a driving scenario, first grip intensity on a steering device for a vehicle according to initial image data depicting a hand of an operator gripping outside set areas that have pressure sensors. The instructions also include instructions to calibrate the learning model for the operator and the steering device using grip measurements and additional image data acquired from gripping inside the set areas. The instructions also include instructions to compute, using the learning model during the driving scenario, second grip intensity outside the set areas on the steering device according to hand images acquired about the operator. The instructions also include instructions to adapt a vehicle parameter of the vehicle according to the second grip intensity.

In one embodiment, a non-transitory computer-readable medium for implementing and calibrating a learning model for inferring operator intent by estimating grip intensity and including instructions, that when executed by a processor, cause the processor to perform one or more functions is disclosed. The instructions include instructions to estimate, using a learning model during a driving scenario, first grip intensity on a steering device for a vehicle according to initial image data depicting a hand of an operator gripping outside the set areas that have pressure sensors. The instructions also include instructions to calibrate the learning model for the operator and the steering device using grip measurements and additional image data acquired from gripping inside the set areas. The instructions also include instructions to compute, using the learning model during the driving scenario, second grip intensity outside the set areas on the steering device according to hand images acquired about the operator. The instructions also include instructions to adapt a vehicle parameter of the vehicle according to the second grip intensity.

In one embodiment, a method for implementing and calibrating a learning model for inferring operator intent by estimating grip intensity is disclosed. In one embodiment, the method includes estimating, using a learning model during a driving scenario, first grip intensity on a steering device for a vehicle according to initial image data depicting a hand of an operator gripping outside set areas that have pressure sensors. The method also includes calibrating the learning model for the operator and the steering device using grip measurements and additional image data acquired from gripping inside the set areas. The method also includes computing, using the learning model during the driving scenario, second grip intensity outside the set areas on the steering device according to hand images acquired about the operator. The method also includes adapting a vehicle parameter of the vehicle according to the second grip intensity.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with implementing and calibrating a learning model for inferring operator intent by estimating grip intensity are disclosed herein. In various implementations, systems inferring operator intent using data from pressure sensors within a steering wheel are unreliable and costly. For example, manufacturing a steering wheel with pressure sensors throughout raises production costs from integration complexity with other components (e.g., haptic motors, instrument controls, etc.). Furthermore, inferring operator intent using pressure data from certain areas of the steering wheel reduces reliability from the grip variability at different steering angles. For instance, an operator grips the steering wheel more intensely at ten degrees than at forty-five degrees when following another vehicle. As such, a system encounters difficulties making inferences associated with grips without having the pressure sensors throughout the steering wheel.

Therefore, in one embodiment, a detection system estimates a grip intensity on a steering device (e.g., steering wheel) using image data depicting a hand from an operator. Here, the detection system acquires the image data while the operator grips the steering wheel. Inexpensive pressure sensors are sparsely located in limited set areas of the steering wheel for calibration, thereby saving production costs. As explained below, a learning model trains to estimate the grip intensity in a testing environment having pressure sensors densely configured throughout the steering wheel and using hand images. Furthermore, in one approach, the detection system calibrates the learning model using grip measurements acquired when the operator grips inside the set areas and image data corresponding to the grip measurements. In this way, the detection system can compute further grip intensities tailored for the operator using acquired hand images through available grip measurements.

In various implementations, the learning model trains offline to detect a hand grasp and shape using measured grip intensity from the set areas and hand images. For example, the learning model outputs grip intensities inferred by correlating test image data of grip patterns with test intensities and a steering angle. As such, the detection system adjusts grip intensity by detecting the shape. For instance, a fuller palm depicted by an image observed by the detection system indicates a tighter grip. Furthermore, the detection system can calculate a mechanical coupling between the hand and the steering wheel for inferring anomalous handling of a vehicle. Accordingly, the detection system implements a learning model trained to infer operator intent (e.g., a steering angle) from hand images and data of sparse pressure sensors, thereby improving grip intensity estimates while reducing costs.

Figure 1:
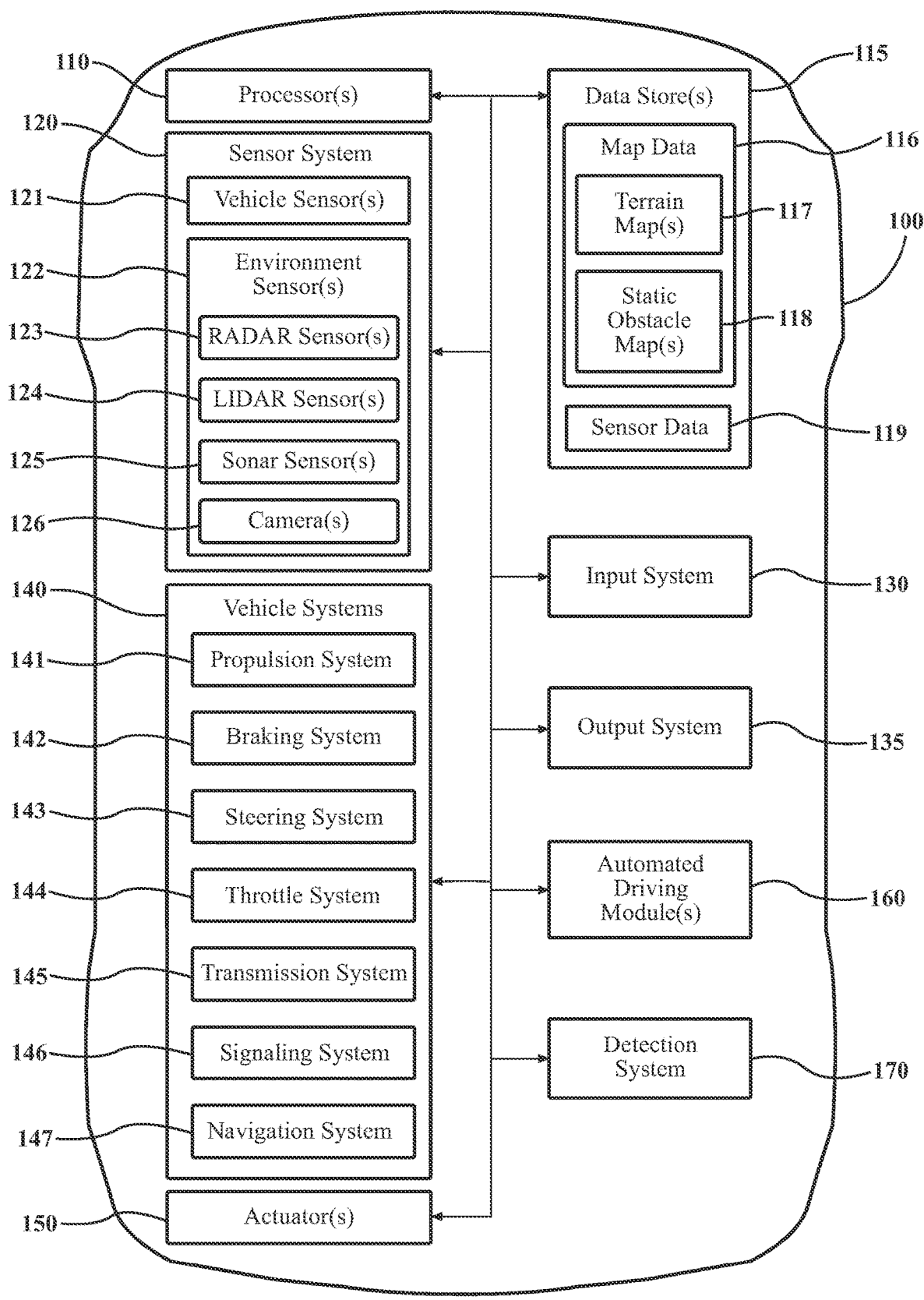
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, a detection system 170 uses consumer electronics (CE), mobile devices, robots, drones, and so on that benefit from the functionality discussed herein associated with implementing and calibrating a learning model for inferring operator intent by estimating grip intensity.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a detection system 170 that is implemented to perform methods and other functions as disclosed herein relating to implementing and calibrating a learning model for inferring operator intent by estimating grip intensity.

Figure 2:
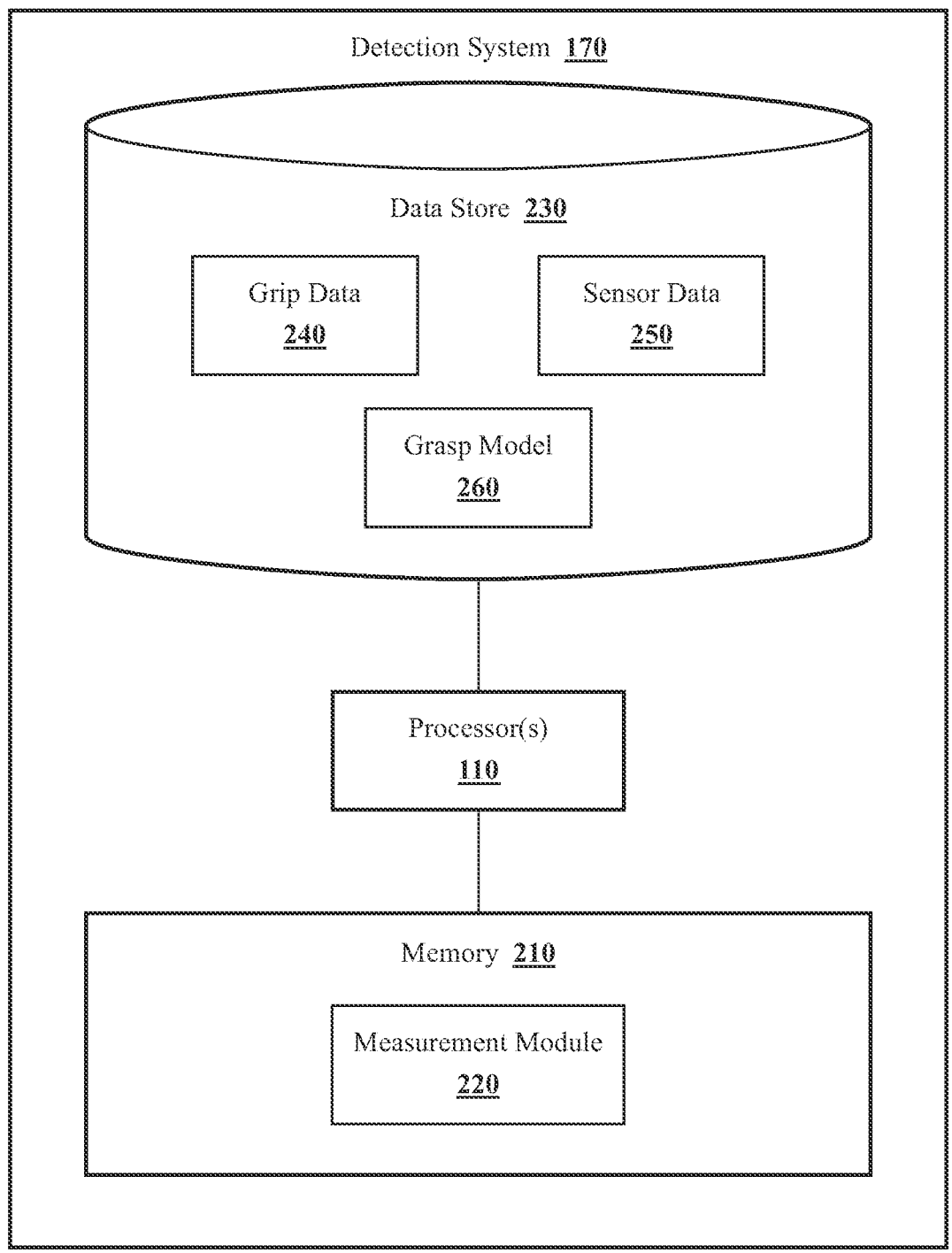
FIG. 2 illustrates one embodiment of a detection system that is associated with implementing and calibrating a learning model for estimating the grip intensity.

With reference to FIG. 2, one embodiment of the detection system 170 of FIG. 1 is further illustrated. The detection system 170 is shown as including a processor(s) 110 from the vehicle 100 of FIG. 1. Accordingly, the processor(s) 110 may be a part of the detection system 170, the detection system 170 may include a separate processor from the processor(s) 110 of the vehicle 100, or the detection system 170 may access the processor(s) 110 through a data bus or another communication path. In one embodiment, the detection system 170 includes a memory 210 that stores a measurement module 220. The memory 210 is a random-access memory (RAM), a read-only memory (ROM), a hard-disk drive, a flash memory, or other suitable memory for storing the measurement module 220. The measurement module 220 is, for example, computer-readable instructions that when executed by the processor(s) 110 cause the processor(s) 110 to perform the various functions disclosed herein.

With reference to FIG. 2, the measurement module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the measurement module 220, in one embodiment, acquires the sensor data 250 that includes at least camera images. In further arrangements, the measurement module 220 acquires the sensor data 250 from further sensors such as radar sensors 123, LIDAR sensors 124, and other sensors as may be suitable for identifying vehicles and locations of the vehicles.

Accordingly, the measurement module 220, in one embodiment, controls the respective sensors to provide the data inputs in the form of the sensor data 250. Additionally, while the measurement module 220 is discussed as controlling the various sensors to provide the sensor data 250, in one or more embodiments, the measurement module 220 can employ other techniques to acquire the sensor data 250 that are either active or passive. For example, the measurement module 220 may passively sniff the sensor data 250 from a stream of electronic information provided by the various sensors to further components within the vehicle 100. Moreover, the measurement module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

Moreover, in one embodiment, the detection system 170 includes a data store 230. In one embodiment, the data store 230 is a database. The database is, in one embodiment, an electronic data structure stored in the memory 210 or another data store configured with routines that can be executed by the processor(s) 110 for analyzing stored data, providing stored data, organizing stored data, and so on. Thus, in one embodiment, the data store 230 stores data used by the measurement module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the data store 230 further includes the grip data 240 and the grasp model 260. Here, the grip data 240 can include one of grip force, pressure, and intensity measurements acquired from sensors of a steering device. As explained below, the sensors are configured on the surface or integrated within the steering device for measuring grip intensity during driving. In one approach, the sensors are on the front and back of the steering device in sparse areas or locations, thereby reducing costs while maintaining estimation reliability.

Furthermore, the grasp model 260 is a learning model implemented by the detection system 170 for processing the grip data 240 and the sensor data 250 to estimate grip intensities on a steering device. For example, the learning model is a physical model using kinematic and dynamic equations for calculating the grip intensities. The physical model can learn correlations from image data and pressure data when operators grip the steering device in a testing environment. In one approach, the detection system 170 uses a machine learning algorithm, such as a convolutional neural network (CNN), to perform semantic segmentation over the sensor data 250 from which further grip information is derived. Of course, in further aspects, the detection system 170 may employ different machine learning algorithms or implements different approaches for performing the associated functions, which can include deep convolutional encoder-decoder architectures, or another suitable approach that generates semantic labels for the separate object classes represented by hand images. Whichever particular approach the detection system 170 implements, the detection system 170 provides an output with semantic labels identifying objects represented in images acquired from the sensor data 250. In this way, the detection system 170 outputs grip information including intensity and shape from outside the set areas on the steering device according to acquired hand images.

Regarding further details on training, in various implementations, the learning model processes image data of grip patterns, initial grip intensity (e.g., force, pressure, etc.), and a steering angle associated with a steering device. The test image data may be acquired using high-resolution cameras from various angles associated with a steering device in a testing environment. Here, the steering device is densely configured with pressure sensors for increased accuracy throughout the body. However, the detection system 170 during implementation acquires grip intensities from sparsely located and inexpensive pressure sensors within the steering device, thereby saving costs. Moreover, the learning model outputs estimated grip information, such as intensity and/or shape, through an encoder-decoder architecture in the testing environment that extracts salient features from the inputted information and infers correlations. Furthermore, the training minimizes losses of the learning model by comparing the grip information to dense force measurements that increase the accuracy of processing image data. In this way, the detection system 170 estimates grip intensity on the steering device using the learning model from acquired image data without relying on costly pressure sensors.

Figure 3:
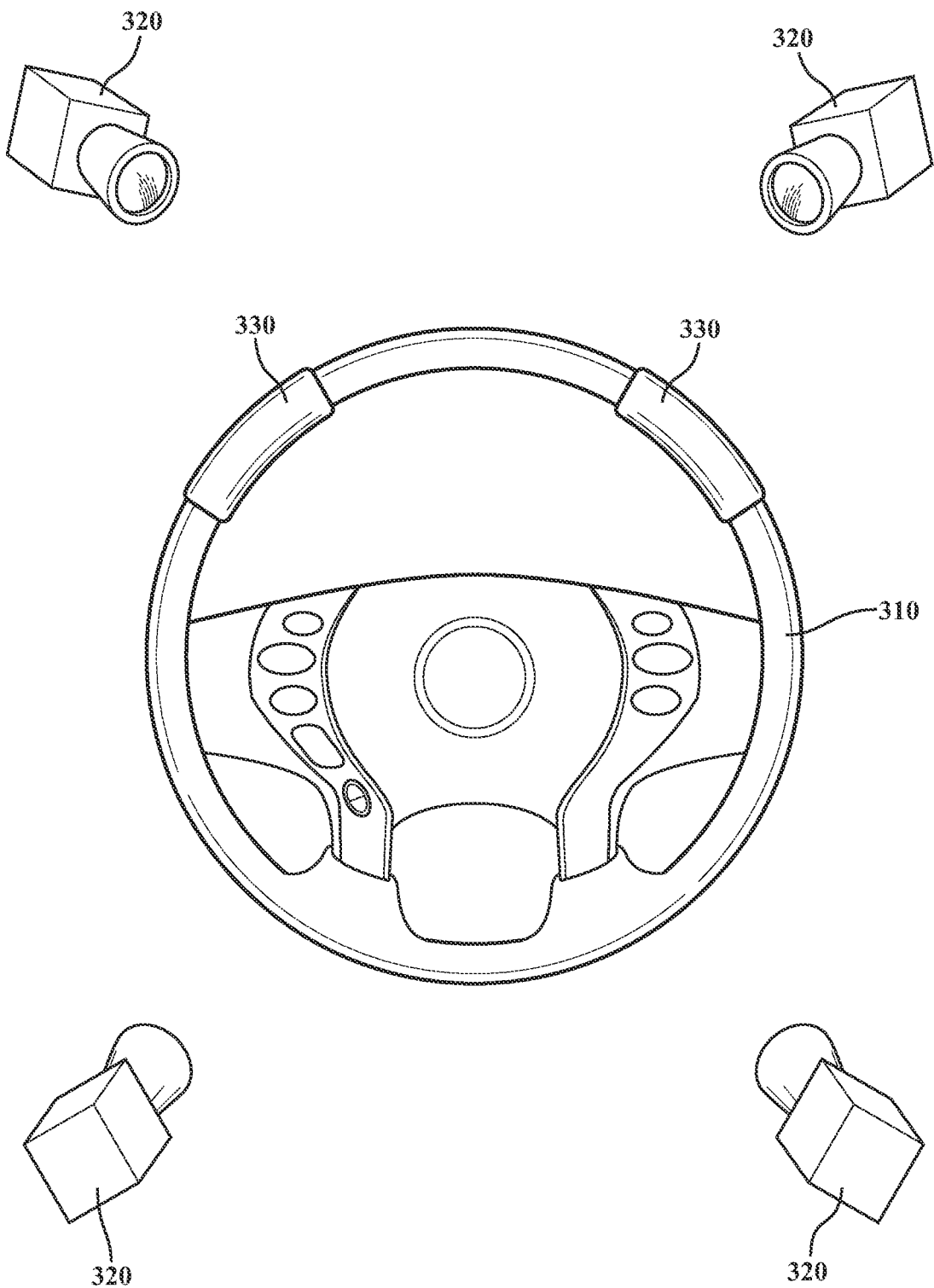
FIG. 3 illustrates one embodiment of the detection system of FIG. 2 implemented in a vehicle having a circular steering device and cameras.

Turning now to FIG. 3, one embodiment of the detection system 170 of FIG. 2 implemented in a vehicle having a circular steering device 310 and cameras is illustrated. In this embodiment, the detection system 170 estimates grip intensity using image data to infer operator intent (e.g., a steering angle), avoid cheating of automated driving, infer operator awareness, and so on, thereby improving system performance. For example, an automated driving module(s) 160 decreases automation mode for safety when inferring weak mechanical coupling from estimated grip intensities. A weak mechanical coupling may be because the operator is driving using one hand, fingertips, palms, elbows, and so on. Although a circular steering device 310 is illustrated, the detection system 170 may estimate grip intensities from other steering devices such as a yoke wheel, a joystick, a knob, and so on.

In various implementations, the measurement module 220 includes instructions that cause the processor 110 to acquire data from the camera(s) 320 and measurements (e.g., pressure, force, etc.) from the pressure sensors 330 within the set areas that are sparsely located. For example, the camera(s) 320 may be a visible light camera, an infrared camera, a monocular camera system, a stereo camera system, and so on. As such, the detection system 170 estimates grip intensity on the circular steering device 310 for the vehicle 100 from the learning model. Here, the image data may depict a hand of an operator using the circular steering device 310. As previously explained, the learning model trains to reliably estimate the grip intensity using the image data irrespective of the operator gripping areas having the pressure sensors 330. However, the detection system 170 may calibrate the learning model for a particular operator by acquiring grip intensity from pressure sensors when the operator touches the set areas. The detection system 170 may calibrate the learning model when a driving session commences or throughout the driving session when the grip measurements are available from the touches.

In various implementations, the detection system 170 calibrates the learning model for the circular steering device 310 using grip measurements and additional image data acquired from gripping the pressure sensors 330 inside the set areas. For example, the detection system 170 compares estimated grip intensity from images including hand grasps from a viewing angle(s) to measured intensity using the pressure sensors 330. Here, the pressure sensors 330 generate data for the detection system 170 to compute an error associated with the grip intensity estimated by the learning model using image data acquired from the camera(s) 320. In this way, the learning model can minimize the error through calibration, thereby improving subsequent estimates using the image data alone.

In one embodiment, the detection system 170 estimates vitals using data from the camera(s) 320 and the learning model. The data may be infrared, visual, and/or other relevant data generated by the camera(s) 320 that the detection system 170 temporally assesses for estimating the blood flow, pulse, vein deformation, and so on. Here, the learning model trains in a simulated environment offline through correlating image data of an operator gripping a steering device with vitals data during various driving scenarios. The detection system 170 may acquire the vitals data from one of pulse, blood flow, and blood oxygen sensors within the steering device. In various implementations, a pulsimeter within the simulation environment external to the steering device generates the data for training the learning model. In this way, the learning model has accurate and reliable data to adapt parameters for computing estimates of operator vitals using image data.

Moreover, during implementation the detection system 170 can adjust estimations of grip intensity using vitals estimated using image data. For example, the detection system 170 increases estimated grip intensity when the learning model outputs that the operator has an elevated pulse (e.g., 130 beats per minute (BPM)). Furthermore, the detection system 170 decreases estimated grip intensity when blood flow is elevated. Accordingly, the detection system 170 improves estimated grip intensity and operator intent using the learning model for vitals measurements.

Figure 4A:
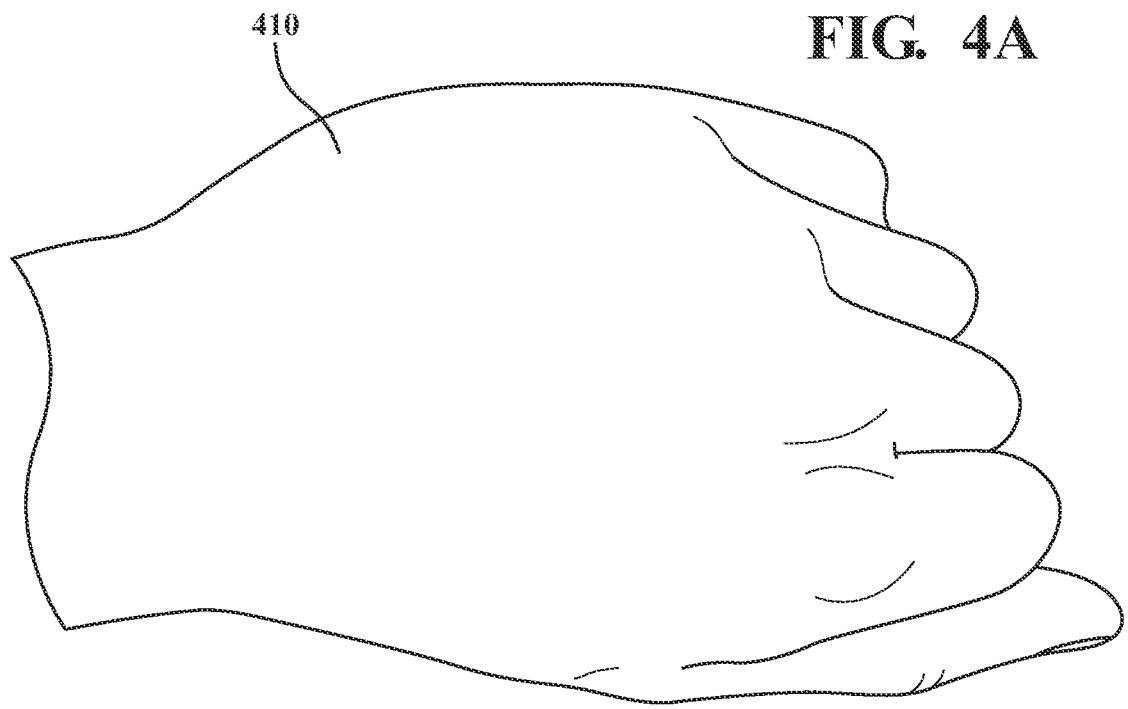
FIGS. 4A and 4B illustrate examples of hand images having different grasps for the detection system to estimate grip intensities.
Figure 4B:
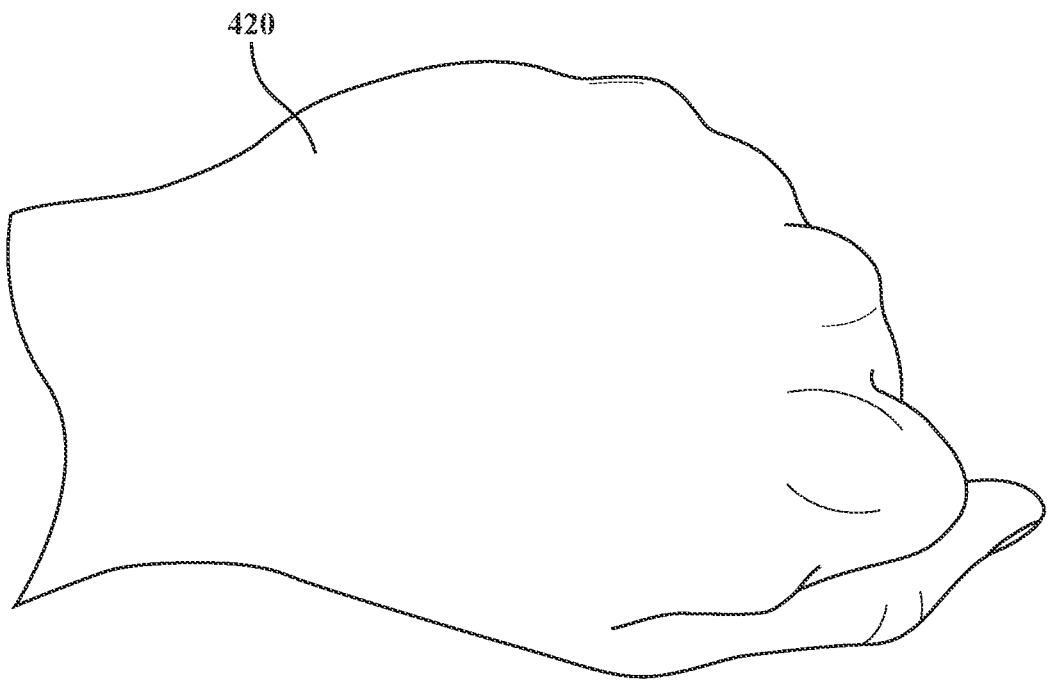

FIGS. 4A and 4B illustrate examples of images having different grips for the detection system 170 to estimate grip intensities. In FIG. 4A, the detection system 170 processes an image having the back of an operator hand and the learning model estimates a looser grip 410. Here, the operator grips areas outside the set areas having the pressure sensors 330 for intensity estimation by the learning model. The detection system 170 calibrates the learning model using data when the operator subsequently grips the pressure sensors 330. The detection system 170 subsequently estimates the looser grip 410 or a tighter grip 420 with higher accuracy as the calibration adjusts the learning model, such as for particular operators or driving scenarios. As previously explained, the detection system 170 can also estimate vitals by training the learning model to correlate hand images with actual measurements involving driving scenarios. For example, blood flow and image data indicate that the operator has whiter knuckles. As such, detection system 170 identifies a more intense level of the tighter grip 420. Thus, the detection system 170 can estimate the vitals to differentiate and identify grip levels between the looser grip 410 and the tighter grip 420.

In various implementations, the detection system 170 estimates grip intensities on a steering device for downstream tasks such as assisted driving or safety systems. For example, the vehicle 100 identifies operator intent (e.g., a steering angle) to execute a steering command in a steer-by-wire (SbW) system that steers without a mechanical coupling. As such, the vehicle 100 avoids anomalous handling using grip intensities during driving scenarios (e.g., distracted driving) because the SbW system is unable to identify operator intent without the mechanical coupling. Regarding safety, the vehicle 100 can pre-charge brakes using a brake-assist system when a series of grip types and intensities indicate weak mechanical coupling from distracted and/or distressed driving. For instance, the operator is tired, sick, or intoxicated during distressed driving which causes the weak mechanical coupling with the steering device. In another example, a driver monitoring system (DMS) utilizes the grip intensities and grip instances to identify various operator states (e.g., sleepy, distracted, etc.) and warn an operator with increased accuracy. In this way, the detection system 170 estimates grip intensities using inexpensive cameras that increase safety and improve features of vehicle systems.

Figure 5:
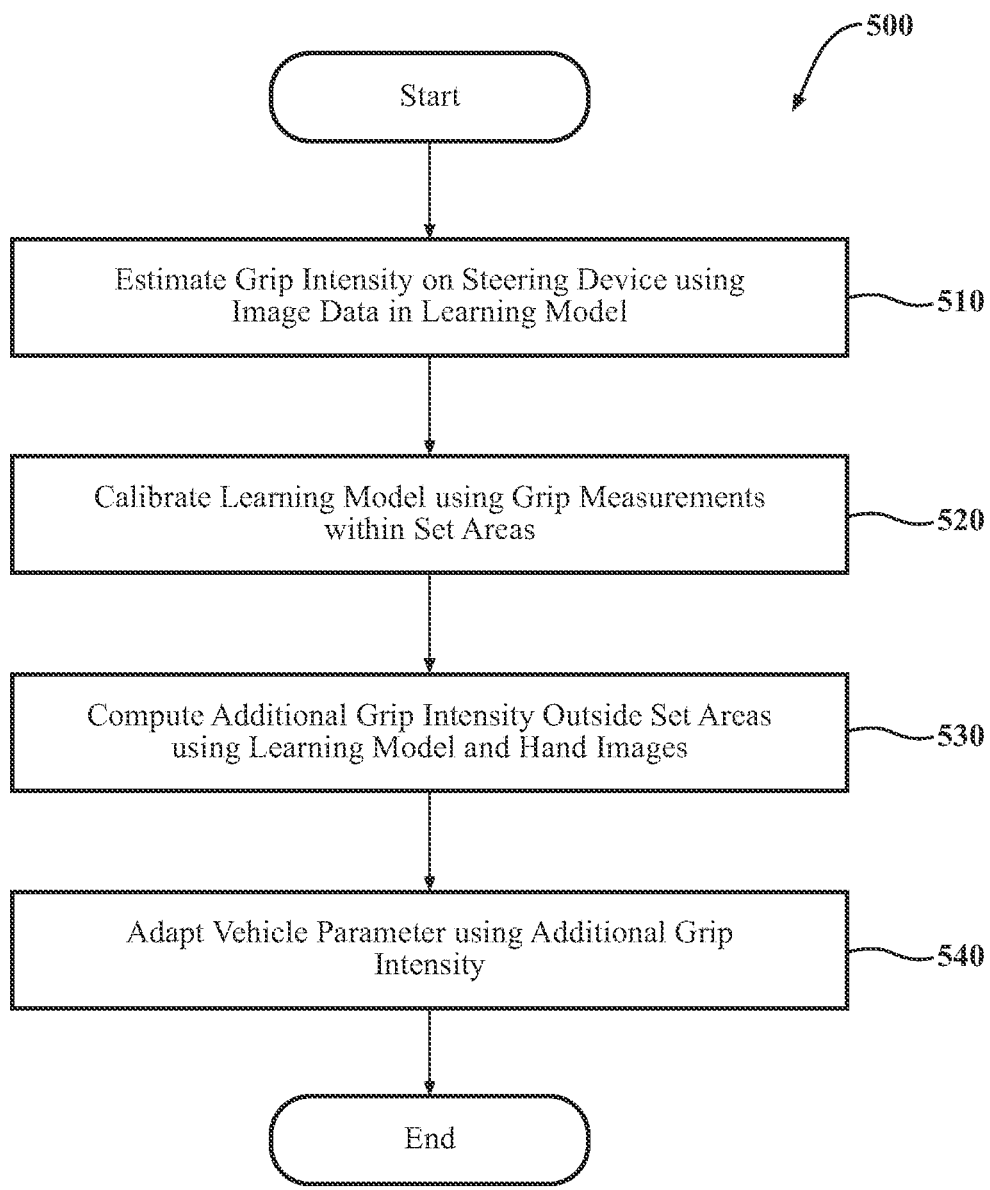
FIG. 5 illustrates one embodiment of a method that is associated with implementing a learning model for estimating the grip intensity using images and sparse sensors.

Now turning to FIG. 5, a flowchart of a method 500 that is associated with implementing and calibrating a learning model for estimating grip intensities using images is illustrated. The method 500 will be discussed from the perspective of the detection system 170 of FIGS. 1 and 2. While method 500 is discussed in combination with the detection system 170, it should be appreciated that the method 500 is not limited to being implemented within the detection system 170 but is instead one example of a system that may implement the method 500.

At 510, the detection system 170 estimates a grip intensity on a steering device using image data in a learning model. Here, the measurement module 220 acquires visual and/or infrared data from a camera(s) monitoring a steering device within the vehicle 100. As previously explained, the learning model can estimate grip intensities using a physical model having kinematic and dynamic equations for calculating the grip intensities. Here, the physical model learns correlations from the image data and pressure data when operators grip the steering device in a testing environment. In one approach, the learning model is a data-driven model (e.g., a CNN) that trains in the testing environment using test image data acquired from cameras at various angles. The data may also be acquired from an image library of operators grasping a steering device. In one configuration, the steering device is densely configured in the testing environment with pressure sensors for increased accuracy. As such, the learning model can output estimated grip information, such as intensity and/or shape through an encoder-decoder architecture by extracting salient features and inferring correlations.

Moreover, the learning model can train by processing image data of grip patterns, initial grip intensity (e.g., force, pressure, etc.), and a steering angle on a steering device. The training minimizes losses of the learning model by comparing this grip information against dense force measurements from precision sensors. Through iterative correlation computations, the learning model trains to reliably estimate grip intensity during implementation. In this way, the detection system 170 estimates grip intensity on the steering device using the learning model from acquired image data without costly pressure sensors.

At 520, the detection system 170 calibrates the learning model using grip measurements within set areas of the steering device. Here, the detection system 170 can calibrate the learning model for particular operators using grip measurements and additional image data acquired from gripping pressure sensors inside set areas. As previously explained, the detection system 170 can estimate grip intensity from images including hand grasps at various angles to measure intensity using the pressure sensors. In one approach, the pressure sensors generate data for the detection system 170 to compute an error of the grip intensity estimated by the learning model mostly using acquired image data. The detection system 170 may calibrate the learning model when a driving session commences or throughout the driving session when the grip measurements are available from the touches. In this way, the learning model minimizes the error through calibration and improves subsequent estimates using the image data when an operator grips outside the set areas. As another benefit, the detection system 170 reduces production costs by having pressure sensors in sparse areas instead of throughout a steering device. Similarly, the detection system reduces the production costs using images from inexpensive cameras to estimate the grip intensity through the trained learning model.

In various implementations, the detection system 170 estimates vitals from hand images to improve grip intensity calculations outside the set areas or while calibrating. For example, blood flow and image data indicate that the operator has reddish knuckles. As such, the detection system 170 identifies a relaxed level associated with a looser grip. Calculations for grip intensities and calibrations of the learning model can utilize these observations to improve accuracy.

At 530, the measurement module 220 computes an additional grip intensity outside the set areas using the learning model and hand images. Here, the detection system 170 has the learning model calibrated for a particular operator, driving scenario, and so on that improves computation accuracy for the additional grip intensity. In one approach, the detection system 170 calculates a grip force and a grip pressure after calibrating the learning model for downstream tasks (e.g., assisted driving). Furthermore, the detection system 170 infers a mechanical coupling and operator intent from the grip force and the grip pressure. As such, computations involving steering angle and/or driving commands can factor the mechanical coupling and handling to improve accuracy and comfort.

At 540, the detection system 170 adapts a vehicle parameter using the additional grip intensity. Here, the vehicle parameter may indicate an intent to alter a vehicle command (e.g., a steering command). For example, the vehicle 100 identifies operator intent (e.g., a steering angle) to execute a steering command in a SbW system. The vehicle 100 avoids anomalous handling during driving scenarios (e.g., distracted driving) using grip intensities because a SbW system is otherwise unable to identify the operator intent without a mechanical coupling. In another example, a DMS utilizes the grip intensities and grip instances to identify various operator states (e.g., sleepy, distracted, etc.) and warn an operator with increased accuracy. Accordingly, the detection system 170 estimates grip intensities using inexpensive cameras that increase safety and improve features of vehicle systems.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the detection system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the detection system 170, and/or the automated driving module(s) 160 may control some or all of the vehicle systems 140 and, thus, may be partially or fully autonomous as defined by the Society of Automotive Engineers (SAE) levels 0 to 5.

The processor(s) 110, the detection system 170, and/or the automated driving module(s) 160 can be operatively connected to communicate with the various vehicle systems 140 and/or individual components thereof. For example, returning to FIG. 1, the processor(s) 110, the detection system 170, and/or the automated driving module(s) 160 can be in communication to send and/or receive information from the various vehicle systems 140 to control the movement of the vehicle 100. The processor(s) 110, the detection system 170, and/or the automated driving module(s) 160 may control some or all of the vehicle systems 140.

The processor(s) 110, the detection system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the detection system 170, and/or the automated driving module(s) 160 can control the direction and/or speed of the vehicle 100. The processor(s) 110, the detection system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine obstacle locations, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the detection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof.

Accordingly, reference should be made to the following claims, rather than to the foregoing specification, as indicating the scope hereof.

What is claimed is:

1. A detection system comprising:
   a camera;
   a processor; and
   a memory storing instructions that, when executed by the processor, cause the processor to:
      estimate, using a learning model during a driving scenario, first grip intensity on a steering device for a vehicle according to first image data depicting a hand of an operator gripping outside a first area and a second area that have pressure sensors;
      calibrate and modify the learning model for the operator and the steering device using grip measurements acquired from the pressure sensors and second image data acquired by the camera from the operator gripping inside the first area;
      compute, using the learning model during the driving scenario, second grip intensity from outside the first area on the steering device according to hand images acquired about the operator using the camera; and
      adapt a vehicle parameter of the vehicle and control the vehicle according to the second grip intensity that indicates a driving state of the operator.

2. The detection system of claim 1, further including instructions to:
   detect a shape of the hand on the steering device using the second grip intensity and the hand images;
   adjust the second grip intensity according to the shape; and
   modify automated braking automatically and output an operator warning automatically by calculating a mechanical coupling between the hand and the steering device according to the second grip intensity without detection of the mechanical coupling by a steer-by-wire system, and the mechanical coupling that is limited indicates anomalous handling of the steering device.

3. The detection system of claim 1, further including instructions to:
   measure, offline in a testing environment, pressure intensities of hand grips using the pressure sensors outside the first area and the second area located throughout the steering device; and
   train the learning model to output grip intensities inferred by correlating test images of grip patterns with the pressure intensities and a steering angle of the steering device.

4. The detection system of claim 1, further including instructions to:
   measure blood flow and pulse of the operator using grip data from an infrared camera; and
   adjust, using the learning model, the second grip intensity using the blood flow and the pulse.

5. The detection system of claim 1, further including instructions to:
   calculate a grip force using the second grip intensity, the grip force is a mechanical coupling for the operator handling the steering device in the vehicle; and
   determine an intent of the operator and altering a steering angle according to the mechanical coupling.

6. The detection system of claim 1, further including instructions to:
   calculate a grip pressure using the second grip intensity, the grip pressure is a mechanical coupling for the operator handling the steering device in the vehicle; and
   alter a driving command in the vehicle according to the grip pressure.

7. The detection system of claim 1, further including instructions to:
   generate a notification by a driver monitoring system (DMS) using the vehicle parameter, wherein the vehicle parameter indicates an intent for altering a vehicle command.

8. The detection system of claim 1, wherein the hand images are from a back view of the operator.

9. The detection system of claim 1, wherein the steering device is one of a joystick, a knob, a yoke wheel, and a circular steering wheel.

10. A non-transitory computer-readable medium comprising:
    instructions that when executed by a processor cause the processor to:
       estimate, using a learning model during a driving scenario, first grip intensity on a steering device for a vehicle according to first image data depicting a hand of an operator gripping outside a first area and a second area that have pressure sensors;
       calibrate and modify the learning model for the operator and the steering device using grip measurements acquired from the pressure sensors and second image data acquired by a camera in communication with the processor from the operator gripping inside the first area;
       compute, using the learning model during the driving scenario, second grip intensity from outside the first area on the steering device according to hand images acquired about the operator using the camera; and
       adapt a vehicle parameter of the vehicle and control the vehicle according to the second grip intensity that indicates a driving state of the operator.

11. The non-transitory computer-readable medium of claim 10, further including instructions to:
    detect a shape of the hand on the steering device using the second grip intensity and the hand images;
    adjust the second grip intensity according to the shape; and
    modify automated braking automatically and output an operator warning automatically by calculating a mechanical coupling between the hand and the steering device according to the second grip intensity without detection of the mechanical coupling by a steer-by-wire system, and the mechanical coupling that is limited indicates anomalous handling of the steering device.

12. The non-transitory computer-readable medium of claim 10, further including instructions to:
    measure, offline in a testing environment, pressure intensities of hand grips using the pressure sensors outside the first area and the second area located throughout the steering device; and
    train the learning model to output grip intensities inferred by correlating test images of grip patterns with the pressure intensities and a steering angle of the steering device.

13. A method comprising:
    estimating, using a learning model during a driving scenario, first grip intensity on a steering device for a vehicle according to first image data depicting a hand of an operator gripping outside a first area and a second area that have pressure sensors;

calibrating and modifying the learning model for the operator and the steering device using grip measurements acquired from the pressure sensors and second image data acquired by a camera from the operator gripping inside the first area;

computing, using the learning model during the driving scenario, second grip intensity from outside the first area on the steering device according to hand images acquired about the operator using the camera; and adapting a vehicle parameter of the vehicle and controlling the vehicle according to the second grip intensity that indicates a driving state of the operator.

14. The method of claim 13, further comprising:

detecting a shape of the hand on the steering device using the second grip intensity and the hand images;

adjusting the second grip intensity according to the shape; and modifying automated braking automatically and outputting an operator warning automatically by calculating a mechanical coupling between the hand and the steering device according to the second grip intensity without detection of the mechanical coupling by a steer-by-wire system, and the mechanical coupling that is limited indicates anomalous handling of the steering device.

15. The method of claim 13, further comprising:

measuring, offline in a testing environment, pressure intensities of hand grips using the pressure sensors outside the first area and the second area located throughout the steering device; and training the learning model to output grip intensities inferred by correlating test images of grip patterns with the pressure intensities and a steering angle of the steering device.

16. The method of claim 13, further comprising:

measuring blood flow and pulse of the operator using grip data from an infrared camera; and adjusting, using the learning model, the second grip intensity using the blood flow and the pulse.

17. The method of claim 13, further comprising:

calculating a grip force using the second grip intensity, the grip force is a mechanical coupling for the operator handling the steering device in the vehicle; and determining an intent of the operator and altering a steering angle according to the mechanical coupling.

18. The method of claim 13, further comprising:

calculating a grip pressure using the second grip intensity, the grip pressure is a mechanical coupling for the operator handling the steering device in the vehicle; and altering a driving command in the vehicle according to the grip pressure.

19. The method of claim 13, further comprising:

generating a notification by a driver monitoring system (DMS) using the vehicle parameter, wherein the vehicle parameter indicates an intent for altering a vehicle command.

20. The method of claim 13, wherein the hand images are from a back view of the operator.

* * * * *